United States Patent
Prestl et al.

(10) Patent No.: US 6,636,172 B1
(45) Date of Patent: Oct. 21, 2003

(54) METHOD FOR ADJUSTING A VEHICLE-MOUNTED RADAR SENSOR

(75) Inventors: Willibald Prestl, Eichenau (DE);
Markus Eberl, Loiching (DE);
Guenter Bauer, Petershausen (DE);
Thomas Sauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/048,641

(22) PCT Filed: Jul. 14, 2000

(86) PCT No.: PCT/EP00/06723
§ 371 (c)(1),
(2), (4) Date: Feb. 4, 2002

(87) PCT Pub. No.: WO01/11387
PCT Pub. Date: Feb. 15, 2001

(30) Foreign Application Priority Data

Aug. 4, 1999 (DE) .......................... 199 36 609

(51) Int. Cl.⁷ ............................................... G01S 7/40
(52) U.S. Cl. ........................................ 342/173; 342/174
(58) Field of Search .............................. 342/165, 173, 342/174, 70, 71, 72, 147; 343/703, 711, 713; 73/1.79

(56) References Cited

U.S. PATENT DOCUMENTS

| | | | | |
|---|---|---|---|---|
| 5,982,481 A | * | 11/1999 | Stone et al. ............. | 356/152.2 |
| 6,020,844 A | * | 2/2000 | Bai et al. ................ | 342/165 |
| 6,087,995 A | * | 7/2000 | Grace et al. ............. | 343/703 |
| 6,329,952 B1 | * | 12/2001 | Grace .................... | 343/703 |
| 6,335,705 B1 | * | 1/2002 | Grace et al. ............. | 343/703 |
| 6,363,619 B1 | * | 4/2002 | Schirmer et al. ......... | 33/288 |
| 6,418,775 B1 | * | 7/2002 | Sager et al. ............. | 73/1.79 |

FOREIGN PATENT DOCUMENTS

| | | |
|---|---|---|
| DE | 196 42 810 C1 | 4/1998 |
| DE | 197 07 591 C1 | 10/1998 |
| DE | 198 40 307 A1 | 3/2000 |
| WO | WO 99/27385 | 6/1999 |

* cited by examiner

Primary Examiner—John B. Sotomayor
(74) Attorney, Agent, or Firm—Crowell & Moring LLP

(57) ABSTRACT

In a method for adjusting a vehicle-mounted radar sensor having three radar lobes, which are emitted in a fan-shaped manner, one of which is a central lobe, and the other two are lateral lobes extending at the same angle, a reflector plate disposed at a distance from the vehicle and perpendicular to the vehicle longitudinal axis is pivoted about a vertical axis. The deviation of the reflector's position angle from an ideal position is determined. The ideal position is one in which the two lateral radar lobes produce at least a substantially identical reflection signal. The radar sensor is subsequently pivoted by a correction angle, which is equal to the deviation of the reflector plate's position angle, but in the opposite direction.

6 Claims, 1 Drawing Sheet

METHOD FOR ADJUSTING A VEHICLE-MOUNTED RADAR SENSOR

BACKGROUND AND SUMMARY OF THE INVENTION

The invention relates to a method for adjusting a radar sensor mounted on a motor vehicle having three radar beams emitted in a fan-shaped manner, one of which extends centrally and the other two extend laterally at the same angle.

The use of this type of radar sensor is expanding. The sensors are implemented in the field of ACC (Automatic Cruise Control) devices for ascertaining the distance of the vehicle from the respective preceding vehicle, and maintaining a constant distance by controlling the drive units appropriately. A presupposition for proper function is an exact adjustment of the radar sensor relative to the longitudinal axis of the vehicle. This adjustment must be made prior to the initial system startup, that is, during the manufacture of the vehicle or in the assembly phase. The problem associated with this condition is that a possible misalignment by a few degrees is not externally perceptible, but can have a considerable impact on the functioning capability of the overall system. If a misalignment has occurred, the system perceives vehicles traveling offset ahead as being located immediately in front of the vehicle, while interpreting vehicles located immediately in front of the vehicle as traveling offset ahead.

The prior art is affected by the following problems:

(1) The reflector plate must be oriented perpendicular to the vehicle axis, both in the vertical and horizontal directions. The use of a common reference plane for the vehicle and reflector can assure the vertical orientation.

(2) If the reflector is oriented perpendicular to the vehicle axis, the signals received in all of the radar channels (e.g., the left, center and right lobes) are compared to one another. If the reception amplitude of the right lobe is stronger than that of the left lobe, for example, it can be safely assumed that the sensor has become misaligned to the left; the extent of the misalignment angle cannot be determined, however. The prior art is therefore a process of "trial and error." After the direction of the misalignment has been determined, the mounted position of the sensor can be corrected by an arbitrary angular distance, and the measurement is repeated, until the operational sign of the misalignment angle changes. This iterative process is extremely time-consuming, and is hardly suited for mass production.

It is the object of the invention to provide a method of the above-mentioned type, which permits a simple, exact adjustment of the radar sensor.

The invention accomplishes this object by providing a method for adjusting a radar sensor mounted on a motor vehicle comprising three radar beams emitted in a fan-shaped manner, one of which extends centrally and the other two extend laterally at the same angle. A reflector plate mounted at a distance from the motor vehicle and vertically in relation to the longitudinal axis of the vehicle is rotated around a vertical axis. The deviation of the angular position of the reflector plate from an ideal position is determined, in which position both lateral radar beams supply an at least approximately equal reflection signal. The radar sensor is then rotated at a correcting angle that is inversely equal to the angular position deviation of the reflector plate.

The invention is based on the following concepts:

(1) The horizontal orientation of the reflector through the measurement of the distances between the rear wheels and the reflector, and the use of this information to calculate the vehicle's skew angle relative to the reflector.

(2) The use of a reflector that can pivot by arbitrary angular distances about a horizontal and a vertical axis. The mounted position of the sensor must be corrected after the final vertical and horizontal misalignment angles have been determined. Additionally, the evaluation unit for the radar signals and the adjusting mechanism of the reflector plate are coupled to one another, which allows for a fully-automated procedure that requires no manual intervention.

Reflector Orientation

The reflector 10 is not initially oriented relative to the vehicle travel axis; in other words, the reflector 10 and the vehicle travel axis deviate from a perpendicular position by the so-called vehicle skew angle. This angle can be calculated through the measurement of the distance of the rear axle from the reflector (vehicle skew angle=arcsin (d1–d2/ 1). The zero position of the reflector is corrected by pivoting the reflector by the angular distance of the vehicle skew angle, so that the reflector and the vehicle form a right angle. Thus, the vehicle skew angle equals zero.

Horizontal Adjustment

Figure 1A:
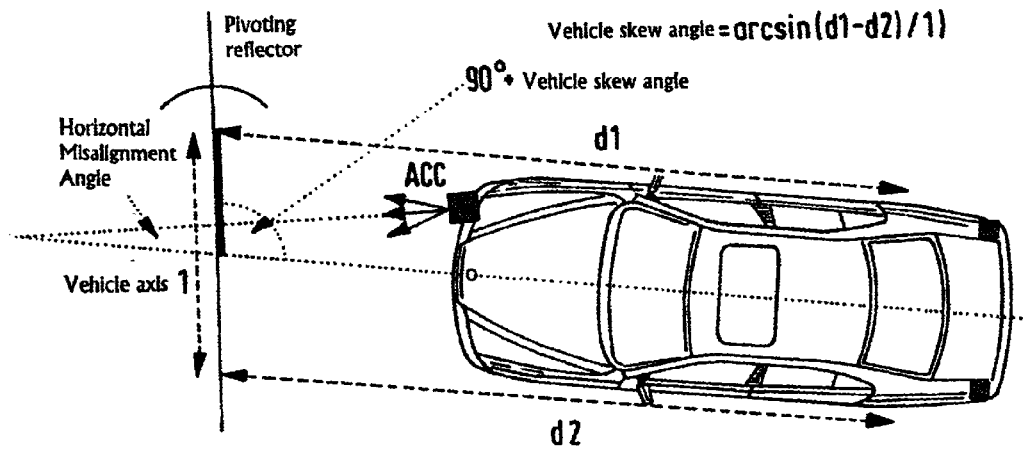
FIGS. 1a–1c illustrate, by way of example, the method according to the invention.

In FIG. 1a, the ACC sensor is shown with a misalignment to the left with respect to the vehicle travel axis. For a triple-lobe radar sensor, this means that the signal received in the right channel is stronger than the one received in the left channel. An automatic pivoting device therefore rotates the reflector counterclockwise until the reception intensities in the left and right channels are identical. The reflector setting at this time (FIG. 1b) corresponds to the difference between the original vehicle skew angle prior to the "reflector orientation" step and the horizontal misalignment angle of the ACC sensor. If, as described, the vehicle skew angle equals zero, the pivot angle of the reflector is equal in distance to the horizontal misalignment angle. The latter could be determined without necessitating a change in the mounted position of the sensor.

Figure 1B:
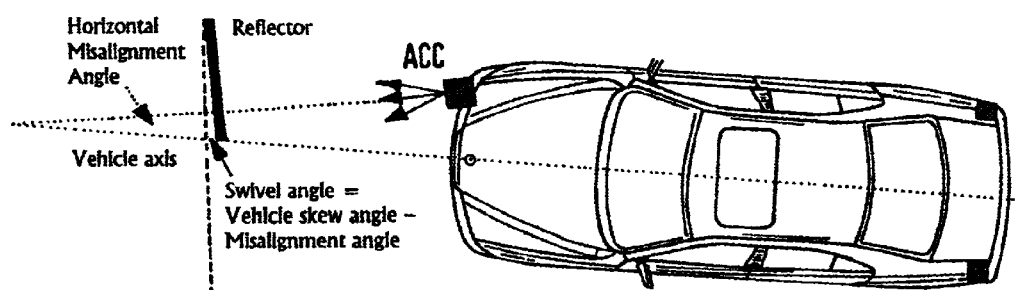

This fact, which is described in FIG. 1b, allows for an automatic sensor adjustment that can be implemented in mass production. For this purpose, the horizontal misalignment angle of the sensor is set at zero. The signal received in the right channel is identical to the signal received in the left channel.

The pivoting reflector used in accordance with the invention also offers alternative adjustment strategies, such as recording the entire antenna pattern through a pivoting movement of the reflector across the entire horizontal angular region. The misalignment angle can thus be ascertained through an analysis of the measured data.

Vertical Adjustment

Figure 1C:
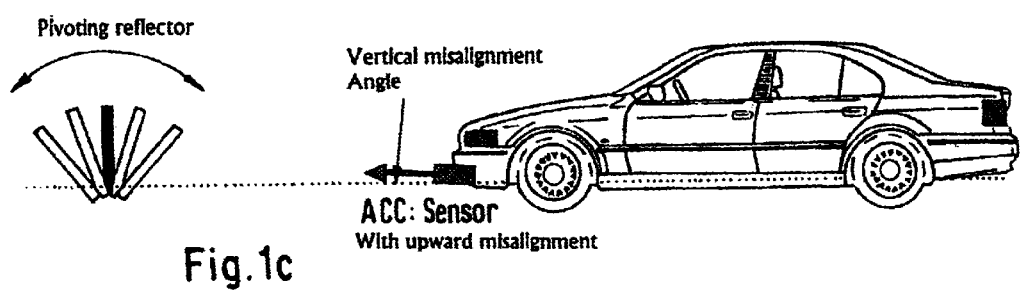

Because the ACC sensor illustrated in the example (FIG. 1c) does not permit an angular resolution in the vertical direction, the following procedure is performed to correct an additional vertical misalignment of the sensor.

The reflector is additionally pivoted across the entire vertical angular region. In the process, the signals received by all three antenna lobes, or only by individual lobes, are recorded. A subsequent analysis of these measured data yields the vertical misalignment angle. In this case as well, it is not necessary to correct the mounted position of the sensor during the determination of the misalignment angle.

The mounted position of the ACC sensor is not corrected until the horizontal and vertical misalignment angles have been determined with an automated method. In contrast to the iterative method employed to this point, a single correction step suffices in the case of a horizontal and a vertical misalignment.

Hence, it is possible to make an optimum adjustment to the radar sensor quickly and simply.

What is claimed is:

1. A method for adjusting a radar sensor mounted on a motor vehicle, the radar sensor having three radar lobes emitted in a fan-shaped manner, one lobe extending centrally and the other two lobes extending laterally at the same angle, the method comprising the acts of:

pivoting about a vertical axis a reflector plate disposed at a distance from the motor vehicle and perpendicular to a vehicle longitudinal axis;

determining a deviation of a position angle of the reflector plate from an ideal position angle, the ideal position angle being one in which the two laterally extending lobes produce an approximately equal reflection signal;

subsequently pivoting the radar sensor by a correction angle, which correction angle is equal to the deviation of the position angle of the reflector plate but in an opposite direction.

2. The method according to claim 1, further comprising the acts of:

pivoting the reflector plate about an axis extending horizontally as well as transversely to the vehicle longitudinal axis; and deriving a vertical mounted position of the radar sensor from the behavior of the reflection signals of the radar lobes when the reflector plate is pivoted upward and downward by a few angular degrees relative to a position that is perpendicular relative to the vehicle longitudinal axis.

3. The method according to claim 1, wherein the act of disposing the reflector plate at a position relative to the vehicle longitudinal axis is performed as a preparatory step.

4. The method according to claim 2, wherein the act of disposing the reflector plate at a position relative to the vehicle longitudinal axis is performed as a preparatory step.

5. The method according to claim 3, wherein the act of positioning the reflector plate further comprises the act of determining distances between the reflector plate and center axes of rear vehicle wheels of the motor vehicle.

6. The method according to claim 4, wherein the act of positioning the reflector plate further comprises the act of determining distances between the reflector plate and center axes of rear vehicle wheels of the motor vehicle.

* * * * *